United States Patent [19]

Weber et al.

[11] 3,773,627
[45] Nov. 20, 1973

[54] TEMPERATURE CONTROL OF DISTILLATION

[75] Inventors: Richard Weber; Henry A. Mosler, both of Morristown, N.J.

[73] Assignee: Esso Research and Engineering Company, Linden, N.J.

[22] Filed: Dec. 13, 1971

[21] Appl. No.: 207,485

[52] U.S. Cl...... 203/2, 203/DIG. 18, 202/DIG. 160, 202/DIG. 206
[51] Int. Cl............................................. B01d 3/42
[58] Field of Search...................... 203/2, DIG. 18; 235/151.12; 202/206, 160

[56] References Cited
UNITED STATES PATENTS

| | | | |
|---|---|---|---|
| 2,684,326 | 7/1954 | Boyd | 203/2 |
| 3,321,380 | 5/1967 | Hillburn | 203/2 |
| 2,489,949 | 11/1949 | Blair | 196/141 |
| 3,464,895 | 9/1969 | Boyd | 203/2 |
| 2,580,651 | 1/1952 | Boyd | 203/2 |
| 2,994,643 | 8/1961 | Smalling | 203/2 |
| 2,252,550 | 8/1941 | Bragg | 196/132 |
| 2,965,549 | 12/1960 | Hudkins | 203/2 |
| 2,995,500 | 8/1961 | Dilbert | 203/2 |

Primary Examiner—Wilbur L. Bascomb, Jr.
Attorney—Leon Chasan et al.

[57] ABSTRACT

A method and system for controlling the operation of a distillation column by adding temperatures measured at points within the column selected to accurately reflect the column's performance and using the temperature thus determined to properly adjust control variables. The proper selection of temperatures to be added allows maintenance of product qualities despite changes in feed compositions or other process disturbances. Typically, in a single feed, two product distillation column temperatures will be measured 20 percent of the distance from the top (or bottom) to the feed tray.

9 Claims, 5 Drawing Figures

3,773,627
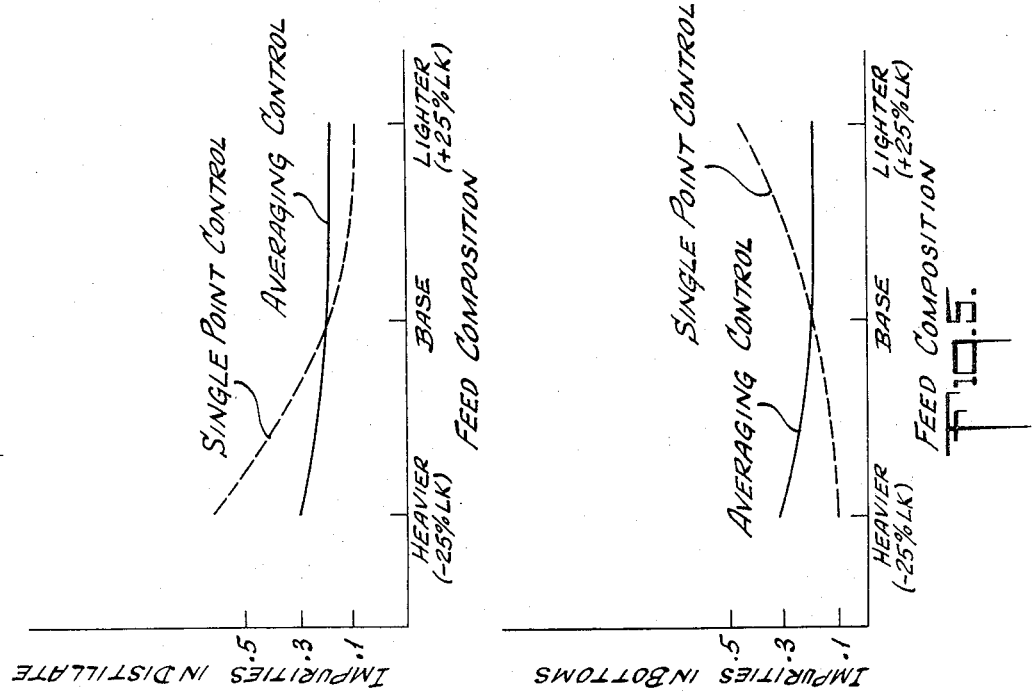
Fig. 4.
Fig. 5.
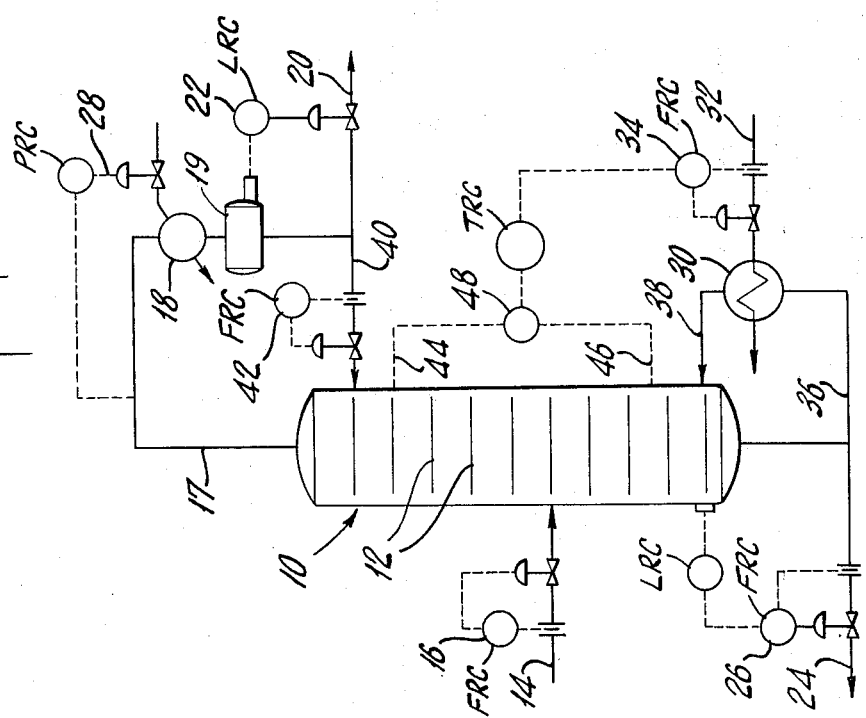
Fig. 1.

TEMPERATURE CONTROL OF DISTILLATION

BACKGROUND OF THE INVENTION

The invention is directed to the general field of instruments for control of distillation columns such as are commonly used in the petroleum and chemicals industry. Many techniques have been used in the past for control of such columns, the details of which may be extremely complex.

The invention incorporates a novel technique whereby temperature measurements made at preselected locations in the column are added and then used to control the process variables in order to adjust for changes within the process.

The basic function of a simple distillation column is to separate a feedstream into two or more product streams. The separation may be into accurately separated individual components or alternatively, into "cuts" each containing many components and characterized by a range of boiling points. It is typical that the distillation column will have lower temperatures at the upper part of the column and higher temperatures at the lower part of the column, assuming that the pressure remains essentially constant throughout. The temperatures reflect compositions in the column, so the typical instrumentation of the column will include at least measurement, if not control, of temperatures at various points throughout the column and its associated facilities.

Temperature is not a true measurement of composition for multicomponent mixtures but is a true measurement for a binary mixture. However, even with multi-component mixtures, it is reasonably correct to say that the temperature is a generally satisfactory measure of compositions within the relatively narrow range of operating conditions such as are normally used in commercial columns. That is to say, although a number of different compositions could provide the same average boiling point that would be measured by a temperature instrument, in practice, the temperature at any point within a column may be expected to indicate the composition actually present. If the column operation is nearly normal, a temperature change indicates a changing composition which will require correction, usually by changing the reflux rate or the reboiler duty. Both changes affect the heat balance and the internal flow rates and thereby the composition of the products. In a typical column, temperature is measured at preselected points in the column and adjustments to the reflux rate or reboiler are made in order to control the temperature at the desired value.

Determining the best location for temperature measuring points is very complex in multi-component distillation. Product qualities must be maintained in spite of operating changes and upsets. The temperatures which indicate composition of the product are those at the top and the bottom of the column. However, small changes in product impurity levels, which are usually important in distillations, are not indicated by a change of temperatures at the top and the bottom. Small quantities of impurities have a very small influence on the product temperature and any changes are completely masked by other variations and the inaccuracy which is inherent in temperature measurements. Thus, temperatures at the top and bottom are not usually used for control of a distillation column. If temperature measurements are to be used at all to reflect product purities, they must be made at points in the column at which the amounts of the impurities are at relatively high levels, and the product qualities inferred therefrom.

It is characteristic of multi-component distillation that the components between which a separation is to be made, the so-called "heavy key" and "light key" components, build up to rather large concentrations at points between the feed tray and the point at which they are considered impurities. That is, the heavy key component builds to a high concentration between the feed tray and the overhead withdrawal point and the light key component builds to a high concentration between the feed tray and the bottom withdrawal point. Tower calculations show that between the feed tray and the top or bottom of the tower the temperatures and the concentration of the key components change widely as conditions within the tower are changed, whereas the overhead and the bottom product temperatures are affected very little if product purities stay relatively constant. It is not always possible to select one particular temperature point which will give good control of a tower and the product purities under all conditions. However, this may be done reasonably well for many towers by simulating different tower operations on computer programs designed for that purpose and selecting a temperature measuring point by inspection of the results of the simulation. A discussion of this method is disclosed in an article by Wood in Chemical Engineering Progress, Vol. 64, No. 1, p. 85, January 1968.

A properly designed single point temperature control system may prove satisfactory in many columns, but it is sensitive to all changes which occur and it does not reflect the performance at both ends of the column. For these reasons, an improved control system is desirable.

More sophisticated temperature control schemes have also been disclosed in a number of prior art references. Typical are U.S. Pat. Nos. 3,464,895, 3,405,035, 2,684,326 and 2,580,651. The technique employed is to use differential temperature measurements to detect changes in column operation and to control the process variables as has been done with single point control. The major advantage of temperature difference control is that it automatically compensates for changes in tower pressure. However, it is not useful in all columns because the temperature difference has a maximum so that controller response must be reversed when the maximum has been passed. For a discussion of this technique and its shortcomings, reference is made to articles by Webber in *Petroleum Refiner*, Vol. 38, No. 5, p. 187 and by Vermillion in *Oil and Gas Journal*, Vol. 59, No. 34, p. 98. A double differential temperature control method was disclosed by Luyben in *I. & E. C. Fundamentals*, Vol. 8, No. 4, p. 739. Other U.S. Pats. which disclose the use of differential temperature instrumentation include Nos.:

| | |
|---|---|
| 3,107,293 | 3,018,229 |
| 2,994,643 | 2,965,549 |
| 3,434,934 | 3,423,291 |
| 3,392,088 | 2,022,809 |

A different approach is that of Grote as disclosed in U.S. Pat. No. 2,725,351. Rather than using differential temperature measurements, Grote measures the temperature at a number of points in the rectification section of the column and uses the average temperature to control the reflux to the upper section of the column. The method of Grote is directed particularly to systems in which there is a wide difference in the boiling point of the lighter and heavier materials. It is disclosed in the Grote patent that an arithmetic average of the temperature throughout the rectifying section gives too slow a response and is unsuitable for use in separating materials having relatively close boiling points. Grote suggests that more conventional control means, presumably single point measurement as previously described, would be more suitable for materials boiling close together. Grote gave as an example of the application of his invention a binary mixture having a difference in boiling points about 270° to 280° F. It can be seen that with such a wide difference in boiling points, very large changes in temperature would occur which could upset more conventional instrumentation. Therefore, temperature averaging is useful to damp the effect on the instrumentation of sudden changes within the column.

Contrary to the teaching of Grote, it has been found that a type of temperature averaging, namely adding temperatures, may be used to control multi-component distillation systems and in fact improves control over prior art techniques when the temperature measuring points are properly selected. The averaging of many points as disclosed by Grote is not practiced, but by judicious selection of two or more points located by the novel method disclosed herein improved control of fractionation is possible. As earlier mentioned, it is typical of multi-component fractionation that temperatures change more rapidly from tray-to-tray in certain regions. Once those regions are determined, as few as two temperature measuring points, may be sufficient to detect changes in product quality at both ends of the column. In the simple case of a single feed-two product tower the rectifying and stripping sections may each need only a single properly chosen temperature point to represent their performance, and the sum of the two will reflect the overall "split" being made in the column. It is possible to use the sum of the temperatures for control of the column, thereby gaining improved response to changing conditions and minimizing changes in product quality.

SUMMARY OF THE INVENTION

A method and system for controlling distillation colunns to minimize the effect of process upsets uses the sum of temperature measurements from two or more points to control key process variables. Measurement of more than one temperature point and the adding of temperatures within the column provides a method of detecting changes in product qualities which may be used to change the heat input as required to adjust the product qualities. Advantages are gained over conventional single point control which does not accurately reflect composition changes, particularly in multicomponent distillation and differential temperature control, which may be unstable. Typically, a properly selected temperature point in the upper section of the column is combined with a corresponding temperature measurement in the lower section of the column. The two temperatures are added and the combined signal is used to adjust heat input to the reboiler, thus varying the vapor and liquid rates throughout the column and thereby controlling the product qualities.

DESCRIPTION OF THE DRAWINGS

FIG. 1 — a typical single feed-two product distillation column illustrating one embodiment of the invention.

FIG. 4 — a diagram showing the effect of a change in feed composition on distillate impurities and comparing conventional control with the results of the disclosed invention.

FIG. 5 — a diagram similar to FIG. 2 showing the effect of change in feed composition on bottoms impurities.

DESCRIPTION OF THE PREFERRED EMBODIMENT

Figure 2:
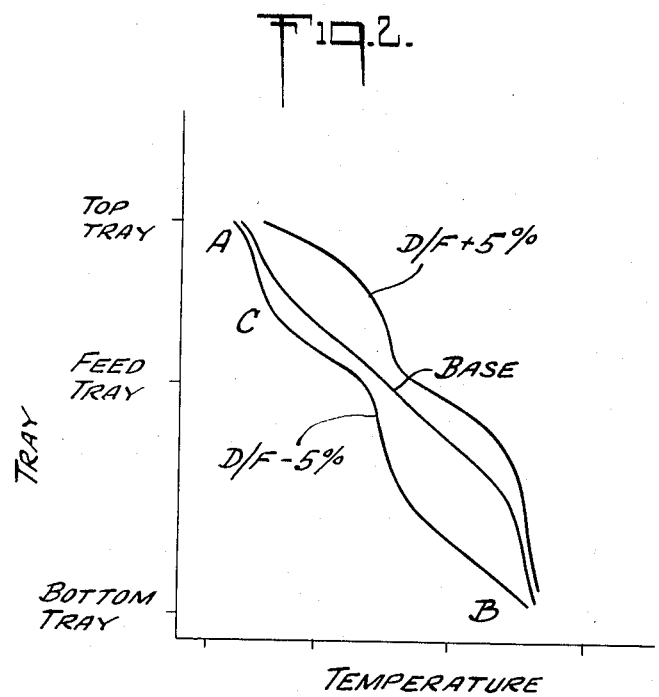
FIG. 2 — a diagram showing the tray temperatures in a typical single feed-two product distillation column.

The method of applying the invention is shown by reference to the simple distillation column of FIG. 1. A typical single feed-two product distillation column is shown generally as 10. The column contains fractionating trays 12 which may be of any type, e.g., sieve tray, bubble cap, jet tray or other. Trays above the feed location will be referred to as rectifying trays, those below as stripping trays. Althrough less common, packing could also be used rather than fractionating trays. Feed to the column 10 enters through line 14 under control Flow Recorder Controller (FRC) 16. The lighter product passes overhead through line 17, is condensed in condenser 18, accumulates in overhead drum 19, and is released by Level Recorder Controller (LRC) 22 to further processing or to storage via line 20. The heavier product is discharged through line 24 under control of cascade controller LRC-FRC 26. Pressure within the column is controlled by Pressure Recorder Controller (PRC) 28 which controls cooling flow to condenser 18. Controlling the pressure within the column 10 permits the temperature instrumentation to indicate composition changes which may occur. Heat is provided to reboiler 30 via line 32 by such media as steam, hot oil or process streams under control of cascade controller Temperature Recorder Controller-Flow Recorder Controller (TRC-FRC) 34.

Heavy material of the same composition as the product in line 24 passes through line 36, enters the reboiler 30, is vaporized and returns via line 38 to the column. Vapor generated in this manner passes up through the column condensing on the trays above and vaporizing liquid thereon. The condensation and vaporization depletes the vapor of the heavier components and enriches it in the lighter components, thereby achieving the desired fractionation effect. Reflux is provided via line 40 under control of FRC 42. It enters column 10 on the top tray and flows down condensing the heavier vapors rising from below, but condensing selectively the heavier components, permitting the lighter ones to be further purified as they pass upwardly in the column.

Temperature points 44 and 46 located within the column provide signals which are added by adding transmitter 48 which, in turn, provides a signal to TRC-FRC 34 for control of heat to the reboiler 30. It has been found that in two product systems studied that temperature points 44 and 46 provide a high sensitivity to changes in product purity at both ends of the column when they are located approximately 20 percent of the rectifying trays down from the top of the column and 20 percent of the stripping trays up from the bottom of the column.

It will be understood that more than two points may be used if it is determined that a better measure of product purity is obtained thereby in the particular system which is being controlled. It is also understood that the system may be applied to towers having more than one feed or more than one product stream.

Although it has been found that the deviations from normal temperatures may occur on all trays between the feed tray and the product withdrawal point, it has been determined that a graph of tray temperature versus composition of the key component considered an impurity, e.g. light key in the bottom product, is essentially a straight line near the upper and lower product withdrawal points indicating its usefulness for control purposes. Similar curves are distinctly curved close to the feed point and thus not as useful for control purposes. In the typical case, trays which are about 20 percent of the distance from the top or bottom of the column to the feed tray give a straight line correlation between temperature and product purity. Such tray locations may be selected for temperature measuring points in order to infer product purity from the temperature measured at that particular point in the column. However, in order to determine the overall performance of the column, it is necessary to use the readings of at least two temperature points. This is done in the present invention by adding at least two temperatures, both of which have a linear relationship to the impurity concentrations in the two products. It has been found that proper selection of these points, typically the 20 percent location, will allow the column to recover from substantial upsets to normal operating conditions.

FIG. 2 illustrates typical changes in tray temperatures which occur with changes in distillate/feed ratios. The base curve shows design tray temperature versus tray location. Two additional curves are shown, both assuming no change in feed composition, one illustrating an increase in distillate/feed ratio of 5 percent and the other a decrease in distillate/feed ratio of 5 percent. An increase of distillate/feed ratio of 5 percent means that more heavy materials, notably the heavy key component, are carried overhead. As these materials increase in concentration, a sharp increase in tray temperatures above the feed point results, even near the top of the column. However, with a decrease in distillate/feed ratio (−5 percent) more light materials, notably the light key component, drop to the bottoms. A sharp decrease in tray temperatures below the feed point results. It can be seen from the curves that at the top of the column the temperature on any tray varies very little from that of the base curve. A temperature measuring point located near the top of the tower (A) is sensitive to heavy key impurities which must be kept out of the overhead product (D/F + 5 percent), but this point is insensitive to light key impurities in the bottom product (D/F − 5 percent). Conversely, a temperature measuring point located near the bottom of the tower (B) is sensitive to light key impurities which must be kept out of the bottom product (D/F−5 percent), but this second measuring point is insensitive to heavy key impurities in the overhead product (D/F+5 percent). Thus, either of these points (A and B) by itself would be unacceptable for control in instances where product quality control of both ends of the tower is required. But, by adding the two measurements together, both of which have one-way sensitivity, the combined signal becomes sensitive to product quality at both ends of the tower.

For a conventional control system in which only a single measuring point is used, two-direction sensitivity is obtained by locating it closer to the feed tray (C). However, such measuring points are extremely sensitive to many changes, particularly to changes in feed composition, and improper corrective action may be taken when a temperature change is misinterpreted. The temperature adding control system described herein responds correctly to upsets caused by changes in feed composition because the measuring points are located further away from the feed tray where one-way sensitivity gives an indication of the separation which is important at that end of the tower. By combining one-way sensitivities, two-way sensitivity is obtained, which reflects the product qualities and is less affected by disturbances within the column which have not changed product qualities.

Figure 3:
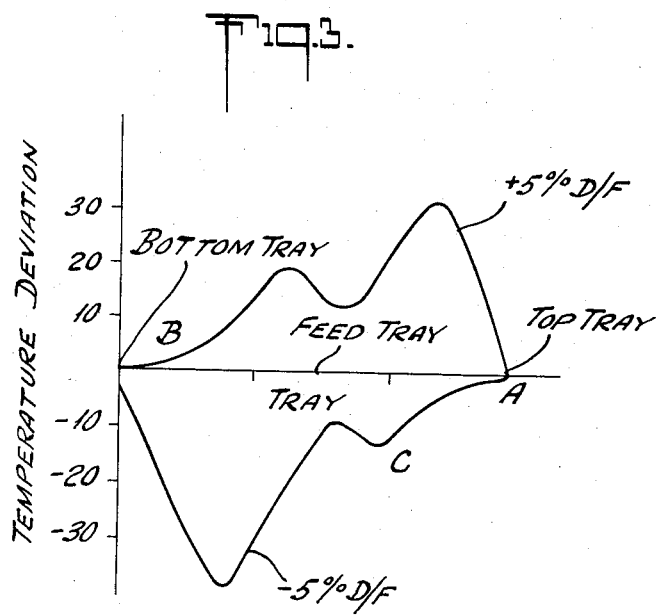
FIG. 3 — a diagram showing the data of FIG. 3 plotted as temperature difference instead of as actual temperature.

FIG. 3 replots the data of FIG. 2 using temperature deviations at each tray. The one-way sensitivity of points A and B are even more clearly shown that in FIG. 2. The wide two-way sensitivity of a single point measurement at (C) is shown.

FIG. 4 illustrates the benefits of the present invention as applied to a single feed-two product tower such as that shown in FIG. 1. The impurities in the overhead product are plotted versus the feed composition. If the light key component in the feed is decreased by 25 percent, the curves show that conventional single point temperature control would permit the impurities in the distillate to rise from approximately 0.2 percent to 0.5 percent as the light key component is decreased and the impurities to be lowered from 0.2 percent to 0.1 percent when the light key component is increased by 25 percent. Neither of these results is desirable and an unacceptable product may result. Even the improvement in product purity is not completely desirable since it occurs at the expense of bottom product purity (see FIG. 5) Changes would have to be made manually in order to optimize the performance of the column and to achieve the desired 0.2 percent impurity level. The benefits of temperature averaging according to the invention also are shown in FIG. 4. For the same variation of light key in the feed, (±25 percent), variation of impurities in the distillate is much less, rising only to a maximum of 0.3 percent under the same condition which gave 0.5 percent with conventional control.

FIG. 5 uses a similar diagram to illustrate the effect of changes on the composition of the bottom or heavier product. In this case also, a variation of 25 percent in the light key component causes the impurities in the bottoms to vary in a reverse manner to that of FIG. 4. Single point temperature control, being unable to detect the full effect of a change in composition, cannot adequately correct for the composition change resulting from the change in feed composition. The present invention, in which at least two temperature points which reflect product qualities are added, clearly provides superior results. The temperature averaging method of the present invention showed only a very small change in the impurity level in the bottoms even with a variation of ±25 percent in the light key component. The benefits of maintaining product purity are most important, but the secondary effects of minimizing the utility consumption and thereby optimizing the performance of the tower automatically are less obvious, but of considerable value.

It should be noted that the change in the quantity of light and heavy key components which has been previously discussed is quite a large disturbance in the feed composition. More typical would be much smaller changes for which it is clear, from FIGS. 4 and 5, that the temperature averaging technique will prevent changes in product quality. Although FIGS. 4 and 5 deal solely with changes in the light and heavy key components in the feed, a number of other disturbances have also been tested, including changes in feed temperature, feed rate, tray efficiency, tray pressure drop, reflux rate, and in quantities of materials lighter than the light key component and heavier than the heavy key component. All of these disturbances will have effects on the operation of the column and ultimately on product purities. The results of those tests indicated that the temperature averaging technique herein disclosed is superior to conventional single point temperature measurements and to material balance controls. The results of studies of the effect of the mentioned variables has been to indicate that the temperature averaging technique is a superior and novel control method which obtains unexpectedly superior results but which would not be anticipated from prior disclosures.

Although as a general rule in a single feed-two product distillation column the locations of the temperature measuring points at the 20 percent distance from the top and the bottom has been generally found to be preferred, a more general procedure would be to perform computer simulations of the performance of any tower to be controlled and, based on the results of the performance, to plot curves showing tray temperature versus the key impurity to be controlled, and from those curves, to determine the location in the tower where the straightest possible correlation was obtained, and to select that location for temperature measuring points. The combination of those temperature points would provide an average index of the product purities and which could be used for controlling key variables to adjust fractionation.

The invention as disclosed through preferred embodiments herein disclosed may be modified without departing from the spirit of the invention and the scope of the claims which follow.

We claim:

1. A method of controlling a distillation column to maintain the desired split between light and heavy key components, said column having product withdrawals above and below the feed tray and including reboiler heat supply and overhead condenser heat removal facilities comprising the steps of:
   a. sensing the temperature on at least one predetermined tray above the feed tray where said temperature is sensitive to heavy key impurities in the overhead product but insensitive to light key impurities in the bottom product and at least one predetermined tray below the feed tray where said temperature is sensitive to light key impurities in the bottom product but insensitive to the heavy key impurities in the overhead product;
   b. adding said sensed temperatures thereby providing a signal sensitive to both top and bottom product compositions relative to said feed tray; and
   c. adjusting the relative flow rates of liquid and vapor within the column in response to the signal of (b) for maintaining the desired split between light and heavy key components.

2. The method of claim 1 wherein the temperatures are sensed at tray locations about 20 percent of the distance between the product withdrawal and the feed tray.

3. The method of claim 1 wherein the relative flow rates are adjusted by controlling the heat supplied to the column.

4. The method of claim 1 wherein the relative flow rates are adjusted by controlling the heat removed from the column.

5. The method of claim 1 wherein the relative flow rates are adjusted by regulating the product withdrawal rates.

6. In a distillation column having a feed point located between points of withdrawal of higher and lower boiling products and reflux and reboiling facilities product quality control means comprising in combination:
   a. at least one temperature sensing means located between said feed point and said withdrawal point of said lower boiling product where said sensed temperature is sensitive to heavy key impurities in said lower boiling product and insensitive to light key impurities in said higher boiling product;
   b. at least one temperature sensing means located between said feed point and said withdrawal point of said higher boiling product where said sensed temperature is sensitive to light key impurities in said higher boiling product and insensitive to heavy impurities in said lower boiling product;
   c. means for adding the said sensed temperatures of (a) and (b);
   d. means responsive to the summed temperature of (c) for adjusting the relative flows of liquid and vapor within the column whereby the split between light and heavy key components is maintained.

7. The distillation column of claim 6 wherein the means for adjusting relative flows of liquid and vapor further comprises a means for controlling the reboiling facilities.

8. The distillation column of claim 6 wherein the means for adjusting relative flows of liquid and vapor further comprises a means for controlling the flow of reflux to said column.

9. The distillation column of claim 6 wherein the means for adjusting relative flows of liquid and vapor further comprises means for regulation of the withdrawal of products whereby the material balance of the column may be adjusted.

* * * * *